United States Patent
Brown et al.

(10) Patent No.: US 6,841,112 B1
(45) Date of Patent: Jan. 11, 2005

(54) BALANCED ROTOR

(75) Inventors: Fred A. Brown, Coronado, CA (US); Pasquale DeMarco, Chula Vista, CA (US)

(73) Assignee: Comair Rotron, Inc., San Diego, CA (US)

( * ) Notice: Subject to any disclaimer, the term of this patent is extended or adjusted under 35 U.S.C. 154(b) by 70 days.

(21) Appl. No.: 10/116,329

(22) Filed: Apr. 4, 2002

Related U.S. Application Data
(60) Provisional application No. 60/283,040, filed on Apr. 11, 2001.

(51) Int. Cl.[7] .......................... B29C 33/12; B29C 45/14
(52) U.S. Cl. ............................ 264/272.19; 264/272.2; 264/277
(58) Field of Search .................... 264/272.19, 272.2, 264/263, 277, 272.15; 29/596, 598, 606, 607

(56) References Cited

U.S. PATENT DOCUMENTS

| | | | |
|---|---|---|---|
| 3,136,370 A | 6/1964 | Carlson | 173/173 |
| 3,245,476 A | 4/1966 | Rodwick | 170/173 |
| 3,584,969 A | 6/1971 | Aiki et al. | 416/132 |
| 3,751,181 A | 8/1973 | Hayashi | 416/132 |
| 3,819,294 A | 6/1974 | Honnold et al. | 416/93 |
| 3,863,336 A * | 2/1975 | Noto et al. | 29/597 |
| 3,918,838 A | 11/1975 | Moody, Jr. et al. | 416/176 |
| 4,200,971 A * | 5/1980 | Shimizu et al. | 29/598 |
| 4,494,028 A | 1/1985 | Brown | 310/156 |
| 4,747,900 A | 5/1988 | Angus | 156/172 |
| 4,762,465 A | 8/1988 | Friedrichs | 416/185 |
| 4,875,829 A | 10/1989 | Van der Woude | 416/2 |
| 4,943,209 A | 7/1990 | Beehler | 416/204 |
| 4,947,539 A * | 8/1990 | Aussieker et al. | 29/598 |
| 4,957,414 A | 9/1990 | Willingham | 416/229 |
| 5,325,003 A | 6/1994 | Saval et al. | 310/43 |
| 5,329,199 A * | 7/1994 | Yockey et al. | 310/263 |
| 5,538,395 A | 7/1996 | Hager | 416/144 |
| 5,584,114 A * | 12/1996 | McManus | 29/596 |
| 5,627,423 A * | 5/1997 | Marioni | 310/156.23 |
| 5,907,206 A * | 5/1999 | Shiga et al. | 310/156.05 |
| 5,927,949 A | 7/1999 | Ogasawara | 416/229 |
| 5,982,057 A | 11/1999 | Imada et al. | 310/43 |
| 6,065,936 A | 5/2000 | Shingai et al. | 416/175 |
| 6,100,611 A * | 8/2000 | Nakase | 310/42 |
| 6,370,761 B2 * | 4/2002 | Shiga et al. | 29/598 |

* cited by examiner

*Primary Examiner*—Angela Ortiz
(74) *Attorney, Agent, or Firm*—Bromberg & Sunstein LLP (57) ABSTRACT

A method of producing a rotor positions a shaft in one of a first mold portion and a second mold portion, and positions a cup in one of the first mold portion and the second mold portion. The first and second mold portions are then mated to form a chamber. Molding material is injected into the chamber to produce a molded part that includes the cup and the shaft. The molded part has a part axis that substantially parallel with the part axis.

19 Claims, 6 Drawing Sheets

BALANCED ROTOR

PRIORITY

This U.S. patent application claims priority to U.S. provisional patent application No. 60/283,040, filed Apr. 11, 2001, the disclosure of which is incorporated herein, in its entirety, by reference.

FIELD OF THE INVENTION

The invention generally relates to motor manufacturing processes and, more particularly, the invention relates to rotor balancing.

BACKGROUND OF THE INVENTION

Electric motors (e.g., DC electric motors) have a rotating motor portion ("rotor") that rotates in response to a magnetic field produced by a stationary motor portion ("stator"). Stated another way, the magnetic field produced by the stator causes the rotor to rotate about an axis formed by a rotor shaft that is rotatably secured to the stator. To produce the magnetic field, the stator typically includes a metallic stator core made up of a plurality of stacked metal laminations, a coil wrapped around the stator core, and a circuit board for selectively energizing the coil. Circuit elements on the circuit board thus detect the magnetic field produced by a magnet on the rotor, and selectively energize the coil to provide rotating energy to the rotor.

Rotors often rotate at relatively high rates, such as six thousand revolutions per minute and higher. When rotating at such high rates, it is important that the rotor be properly balanced to ensure that it rotates without significantly vibrating. Among other disadvantages, vibrations can cause the motor to malfunction, and can reduce the lifetime and efficiency of the motor. A motor generally is considered to be balanced when the axis of its shaft is substantially coaxially aligned with the effective axis of the remainder of the rotor. This alignment typically ensures that the rotor smoothly rotates about its axis with negligible vibration.

Shafts commonly are connected to the remainder of the rotor during a mechanical or manual assembly process. Such processes, however, commonly misalign the shaft with the axis of the remainder of the rotor. For example, the shaft may not be perpendicularly connected to the remainder of the rotor, and/or the axis of the remainder of the rotor may not be coincident with the axis of the shaft. Consequently, additional processes are required to both test each produced rotor, and make adjustments to the weighting of the rotor when a tested rotor is determined to be improperly balanced. In addition to increasing manufacturing costs, this process is prone to error.

SUMMARY OF THE INVENTION

In accordance with one aspect of the invention, a method of producing a rotor positions a shaft in one of a first mold portion and a second mold portion, and positions a cup in one of the first mold portion and the second mold portion. The first and second mold portions then are mated to form a chamber. Molding material is injected into the chamber to produce a molded part that includes the cup and the shaft. The molded part has a part axis that is substantially coaxial with the part axis.

In some embodiments, the act of mating includes biasing the shaft to be substantially parallel to the cup axis. The cup may have a cup draft and be positioned in the first mold portion via a cup recess having a recess draft. In such case, the cup draft is substantially equal to the recess draft. The cup and shaft illustratively may be manufactured from metal.

In accordance with another aspect of the invention, a method of producing a rotor fixedly positions a cup (having a cup axis) in a molding machine, and fixedly positions a shaft in the molding machine. The shaft is coaxial with the cup axis within the molding machine. Molding material is injected into the molding machine to form a molded part that includes the cup and shaft.

In illustrative embodiments, the method also secures a magnet to the cup. The molded part may include a propeller coupled about the cup. In various embodiments, the molding machine implements insert molding processes. The cup may be positioned in the molding machine before the shaft is positioned in the molding machine. Alternatively, the shaft is positioned in the molding machine before the cup is positioned in the molding machine. When formed, the molded part is substantially balanced. The molding material illustratively is a resin.

In accordance with other aspects of the invention, a method of producing a rotor provides a molding machine with a molding chamber. A cup (having a cup axis) and a shaft are inserted into the molding chamber. The molding chamber is configured to coaxially align the shaft with the cup axis. Molding material is injected into the molding chamber, consequently coupling with the cup and shaft to form a molded part.

In some embodiments, this aspect of the invention secures a magnet to the cup. The molded part may include a propeller (impeller) about the cup. The molding machine illustratively implements insert molding processes, and the molded part is substantially balanced. The cup may have a top surface that is substantially perpendicular to the shaft when the cup and shaft are within the molding chamber.

In accordance with still other aspects of the invention, a molding machine for producing a rotor includes a first mold portion and a second mold portion. The mold portions cooperate to define a molding chamber having an inlet for receiving molding material. The molding chamber is shaped to 1) receive both a cup (having a cup axis) and a shaft, and 2) to form a propeller about the cup after molding material is received within the chamber. The propeller couples the cup with the shaft. The molding chamber is configured to fixedly secure the cup and shaft in the molding chamber so that the cup axis is substantially coaxial with the shaft when molding material is received therein.

The molding chamber is openable to deliver a molded part having the cup, shaft, and cured molding material about the cup. The molded part is substantially balanced.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments of the invention, a rotor is produced by injecting molding material about a cup and a shaft that are fixedly positioned in a molding machine. Use of this process produces a very high percentage of rotor assemblies (i.e., shaft, cup, and cured molding material) that are properly balanced. Details of illustrative embodiments are discussed below.

Figure 1:
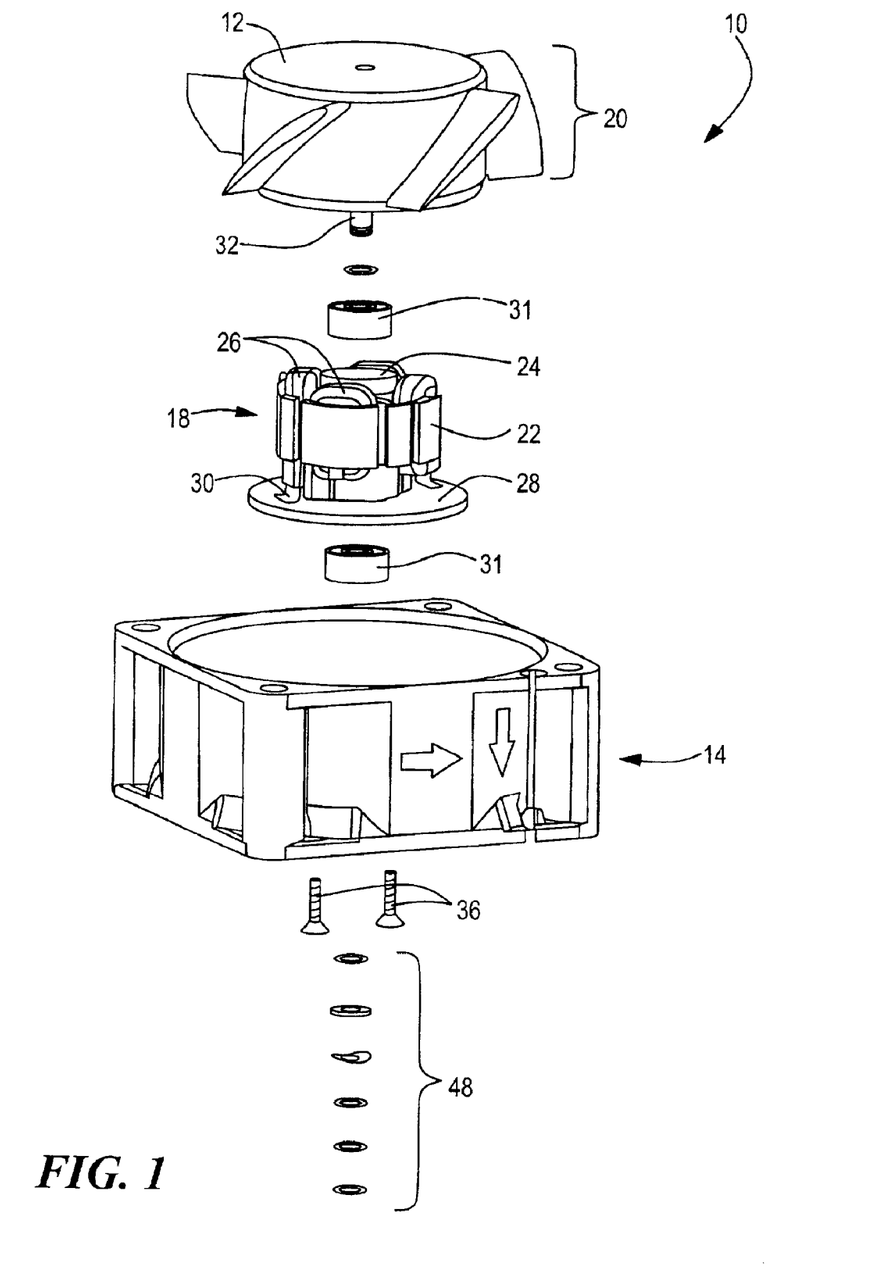
FIG. 1 schematically shows an exploded view of a motor using a rotor produced in accordance with illustrative embodiments of the invention.

FIG. 1 schematically shows an exploded view of a DC motor (referred to herein as "motor 10") having a rotor 20 that was produced in accordance with illustrative embodiments of the invention. The motor 10 includes a propeller 12 and thus, is a part of a cooling fan. To that end, the motor 10 includes a housing 14 with venturi (not shown), a stator portion 18 secured to the housing 14, and the rotor 20 (which includes the propeller 12 and is shown in greater detail with reference to FIGS. 2 and 3). It should be noted that although the motor 10 is implemented as a fan, illustrative embodiments apply to other applications that use motors. Accordingly, description of the motor 10 as a fan is by illustration only and not intended to limit various embodiments of the invention. In a similar manner, although the discussed motor 10 is a DC motor, principles of the invention apply to other types of motors, such as AC motors.

It should be noted that although a propeller 12 is shown, embodiments of the invention apply to other elements that perform a similar air flow function. For example, an impeller may be used and thus, is considered equivalent to a propeller.

The stator 18 includes an insulated stator core 22, coils 26 wrapped about the stator core 22, and a circuit board 28 having electronics for controlling the energization of the coils 26. In illustrative embodiments, the stator core 22 is insulated by a molded insulation layer having an arbor 29 extending through a central tubular opening of the stator core 22. Bearings 31 are secured within the arbor 29 for receiving a rotor shaft. For additional details of the insulation layer, see pending U.S. provisional patent application No. 60/270,788, the disclosure of which is incorporated herein, in its entirety, by reference. Also see the United States patent application claiming priority from the noted provisional patent application 60/270,788, the disclosure of which also is incorporated herein, in its entirety, by reference.

The circuit board 28 may be a printed circuit board having electronics for producing a magnetic field (via the coils 26) based upon the rotational position of the rotor 20. For example, for purposes of commutation, the circuit board 28 includes a magnetic sensor 30 (e.g., a Hall effect sensor), switching circuitry (not shown), and other related circuitry for controlling the flow of current to the coils 26. For additional details relating to circuit elements that may be included on the circuit board 28, see, for example, applicant's earlier U.S. Pat. No. 4,494,028, the disclosure of which is incorporated herein, in its entirety, by reference.

Figure 2:
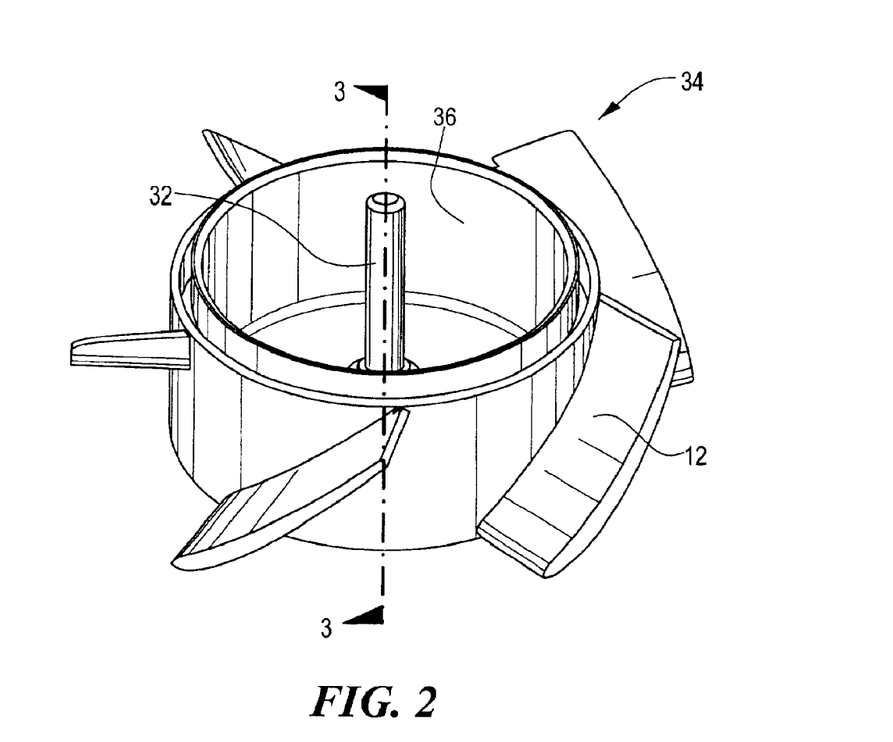
FIG. 2 shows a perspective view of a rotor assembly produced in accordance with illustrative embodiments of the invention.

FIG. 2 shows a perspective view of a rotor assembly 34 produced in accordance with illustrative embodiments. In particular, the rotor assembly 34 includes the propeller 12, a steel cup 36 supporting the propeller 12, and a metal shaft 32 extending from both the center of the steel cup 36 and the propeller 12. When assembled, the shaft 32 is received by the bearings 31 secured within the arbor 29. Details of one illustrative method of assembling the motor 10 are discussed below with reference to FIG. 5. Although not shown in FIG. 2, an annular permanent magnet circumscribing the interior of the steel cup 36 illustratively is inserted within the cup 36 to interact with the above described poles.

Figure 3:
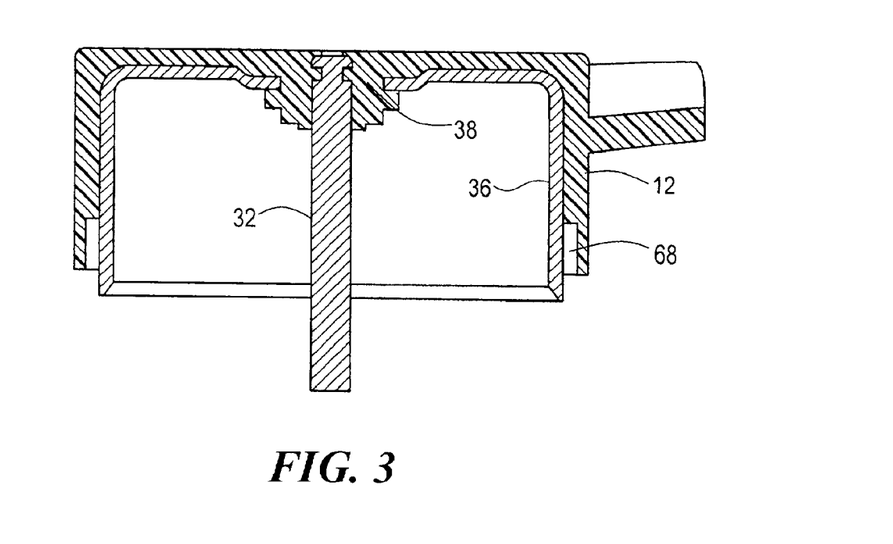
FIG. 3 schematically shows a cross-sectional view of the rotor shown in FIG. 2 across line 3—3.

FIG. 3 schematically shows a cross sectional view of the rotor assembly 34 shown in FIG. 2 across line 3—3. As shown in this figure, the shaft 32 preferably is substantially perpendicularly mounted to the cup 36 and propeller 12. Stated another way, the shaft axis is coaxially aligned with the central axis of the cup 36 and propeller 12. Moreover, the shaft 32 is secured to and contacts the propeller 12 only and thus, does not contact the cup 36. To that end, the cup 36 includes a center hole 38 having an inner diameter that is much greater than the outer diameter of the shaft 32. For example, the center hole 38 may have a diameter of 0.310 inches, while the shaft 32 may have a largest outer diameter of about 0.1 inches. In addition, the shaft 32 has a groove 40 that forms a securing flange 42 at the end of the shaft 32 nearest the cup 36. As discussed in greater detail below with reference to FIG. 5, in addition to forming the propeller 12, cured molding material secures the shaft 32 to the cup 36. The securing flange 42 thus acts as an anchor to secure the shaft 32 to the cured molding material. In some embodiments, the shaft 32 also has a knurled outer surface, which is covered by the cured molding material. This surface further secures the shaft 32 with the remainder of the rotor assembly 34.

In alternative embodiments, the rotor 20 may include through holes (not shown) to permit ventilation to the interior of the motor 10. In such case, the cup 36 is manufactured to include holes, and the propeller 12 also includes corresponding holes. Details of manufacturing processes of rotors 20 both with and without through holes are discussed in greater detail below.

Figure 4A:
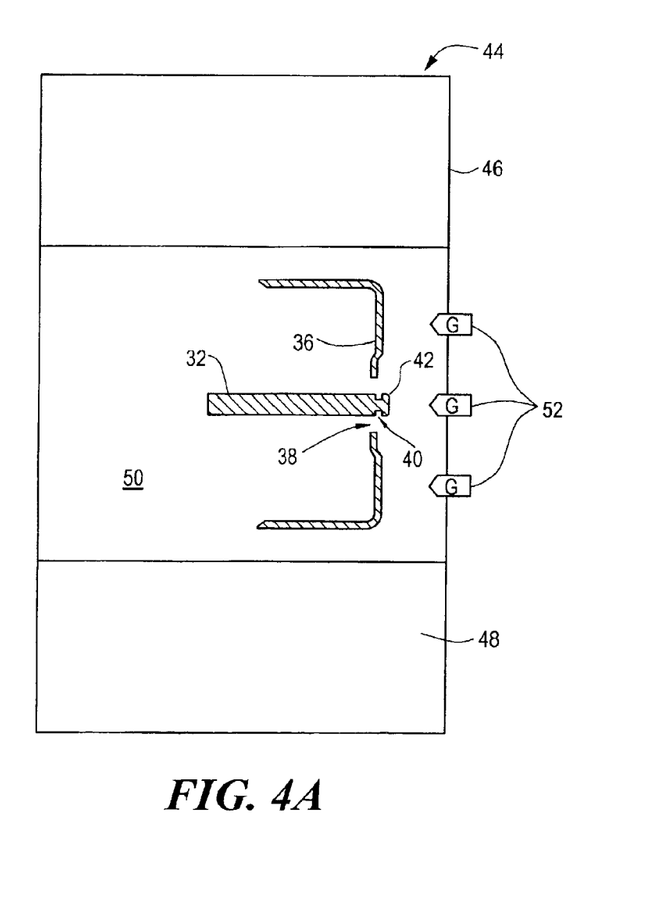
FIG. 4A schematically shows a cross-sectional view of a molding machine configured in accordance with illustrative embodiments of the invention.

FIG. 4A schematically shows a molding machine 44 that may be used to implement illustrative embodiments of the invention. Specifically, the molding machine 44 illustratively is an insert molding machine 44 having a first mold half 46 and a second mold half 48 that form a molding chamber 50 when placed in registry. In addition, the molding machine 44 includes inlets containing a plurality of valve gates 52 for valving liquid molding material into the molding chamber 50. In illustrative embodiments, the molding machine 44 includes three valve gates 52. The cup 36 and shaft 32 are shown schematically in cross section within the molding chamber 50. As noted herein, to produce a balanced rotor 20, the shaft 32 and cup 36 are fixedly secured within the molding chamber 50 to be in a substantially perpendicular relationship.

It should be noted that the chamber 50 is shown schematically only. Accordingly, those skilled in the art should understand that the configuration of the molding chamber 50 fixedly secures the cup 36 and shaft 32 as shown. In addition, those skilled in the art should also understand that the chamber 50 is shaped to produce the propeller 12.

Figure 4B:
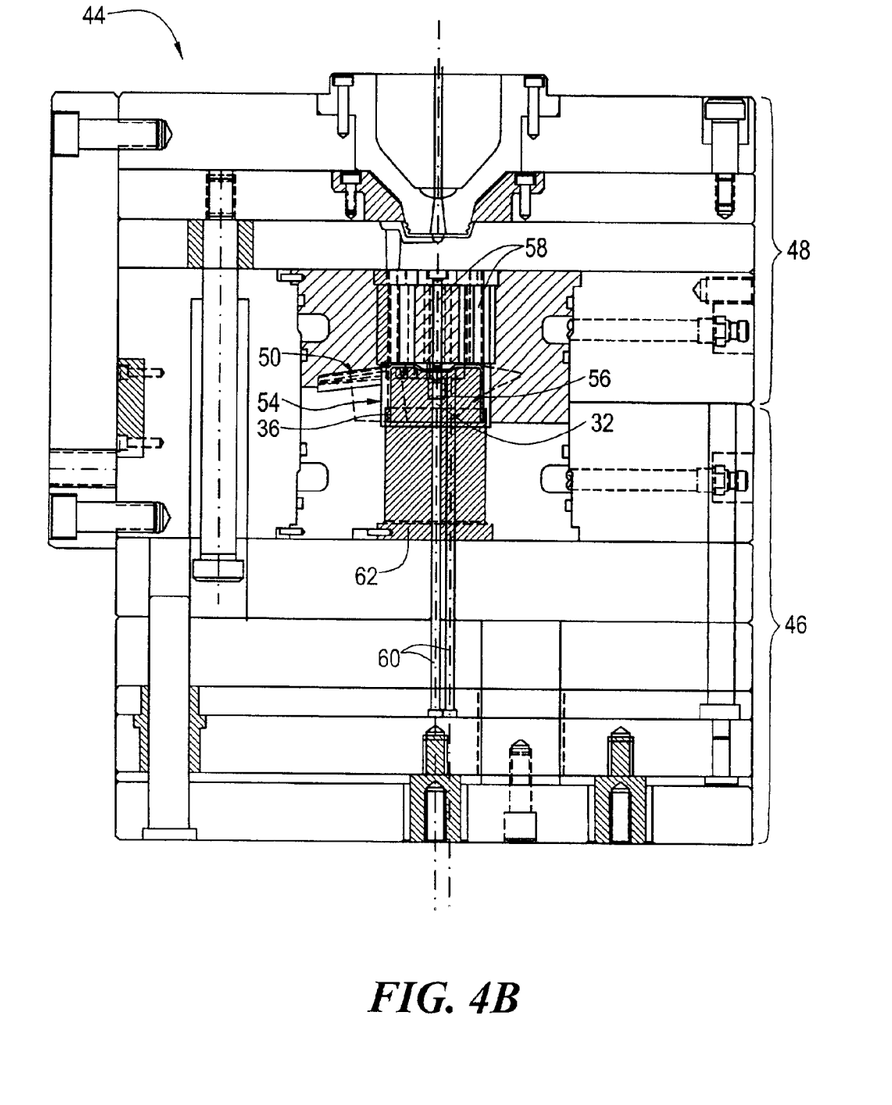
FIGS. 4B–4D show additional details of a molding machine that may be used in illustrative embodiments of the invention.
Figure 4C:
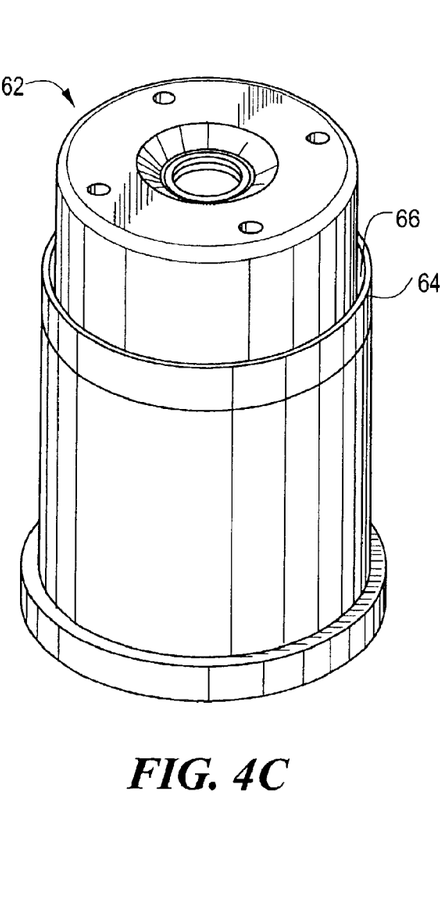
Figure 4D:
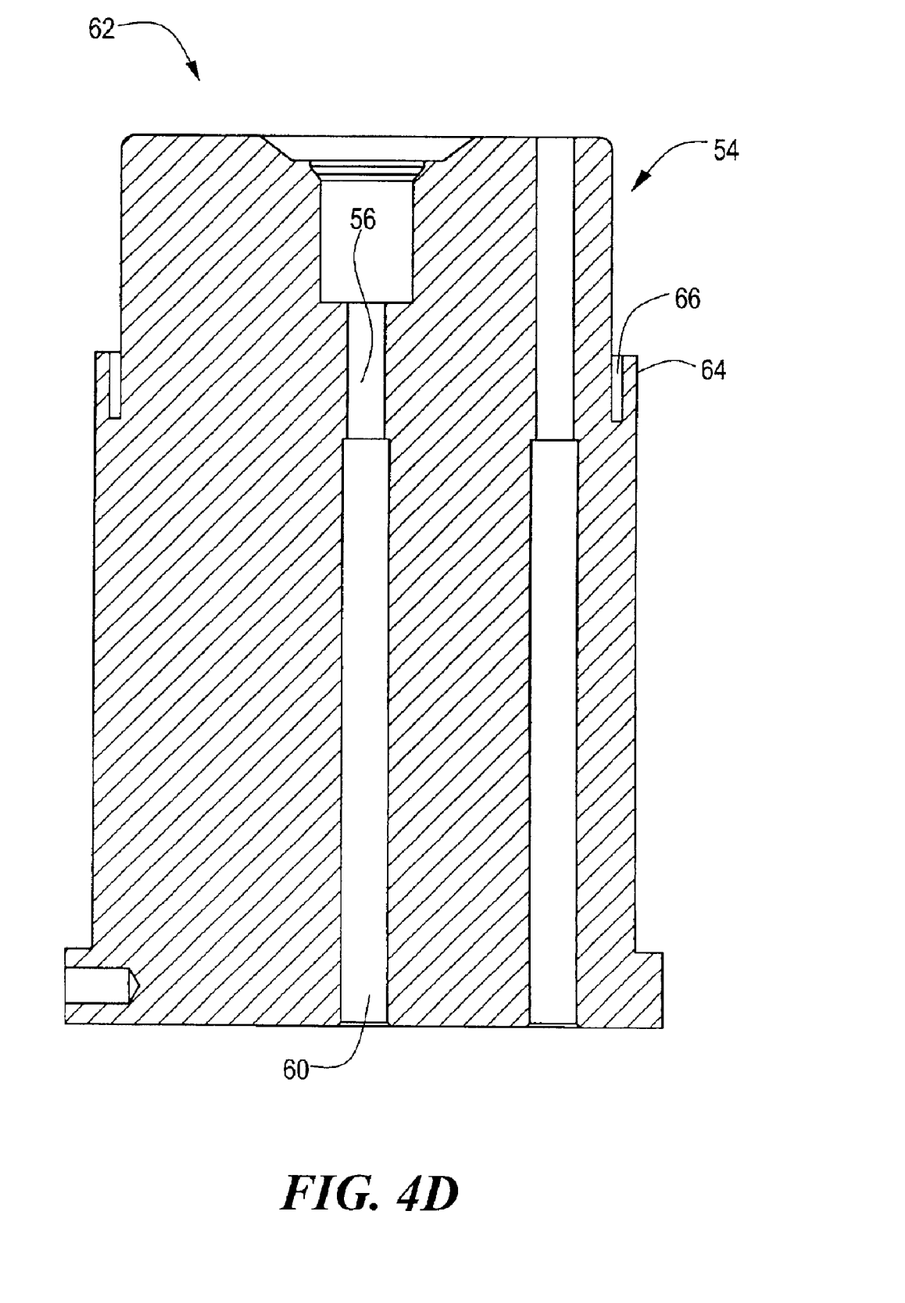

FIGS. 4B, 4C, and 4D schematically show additional details of the molding machine 44. More particularly, FIG. 4B shows the interior of the molding machine 44 with the first mold half 46 and second mold half 48. In addition, FIG. 4B also shows the cup 36 and shaft 32 positioned within the mold halves 46 and 48.

As shown in FIG. 4B, the cup 36 and shaft 32 are inserted into respective cup and shaft recesses 54 and 56 (see FIGS.

4B and 4D) within the first mold half 46. The cup and shaft recesses 54 and 56 are in part formed by a central portion 62 of the first mold half 46. The first mold half 46 thus also includes a plurality of securing pins 58 to ensure that the shaft 32 and cup 36 are secured within the first mold half 46 before and while the second mold half 48 is coupled with the first mold half 46. The securing pins 58 may be considered to provide a "preload" to the shaft 32 and cup 36, thus ensuring their position within the mold halves 46 and 48.

FIG. 4B also shows the shape of the chamber 50 formed when the two mold halves 46 and 48 are coupled together. Specifically, the chamber 50 has the shape of a propeller that is to be formed around the cup 36. The molding machine 44 also includes a plurality of ejector pins 60 to eject the final part from the first mold half 46. Details of the manufacturing and ejection process are discussed below.

FIGS. 4C and 4D schematically show additional details of the central portion 62 of the first mold half 46. The central portion 62 includes an inner diameter that forms the cup recess 54 (FIG. 4B), and an inner diameter for forming the shaft recess 56 (FIGS. 4B and 4D). The central portion 62 illustratively is formed to include a specified draft of about 1.5–2.0 degrees, thus permitting the finished part to be readily ejected from the first mold half 46. Accordingly, the cup 36 illustratively is produced to have a corresponding draft.

The central portion 62 also includes a lower collar portion ("collar 64") that forms an annular void 66. When positioned in the first mold half 46, the open end of the cup 36 is inserted into the annular void 66. This enables injected material to form a corresponding void 68 (FIG. 3) on the finished product. This corresponding void 68 permits balancing material to be injected, if necessary. Of course, illustrative embodiments should produce a minimal number of rotors 20 that require balancing material. The corresponding void 68 nevertheless should be included in the event some other process or portion of the finished product causes an imbalance.

In illustrative embodiments, the shaft 32 and cup 36 are secured within the molding chamber 50 with very close tolerances. The tolerances are selected so that if the shaft 32 and cup 36 were positioned within the mold halves 46 and 48 at their farthest from ideal points, the resultant rotor assembly 34 still should be sufficiently balanced. To that end, the outer diameter of the shaft 32 is slightly smaller than the inner diameter of the shaft recess 56. For example, the inner diameter of the shaft recess 56 may be about 0.0005 inches larger than the outer diameter of the shaft 32. In a similar manner, the outer diameter of the cup 36 illustratively is slightly smaller than the inner diameter of the cup recess 54. As a further example, the inner diameter of the cup recess 54 may be 0.001 to 0.002 inches larger than the outer diameter of the cup 36. In such case, no locking or securing mechanism is required to secure the cup 36 and shaft 32 within the molding machine 44. Their close tolerances should suffice to effectively secure such components. In alternative embodiments, however, the shaft 32 and/or cup 36 may be locked in place within the molding machine 44.

Figure 5:
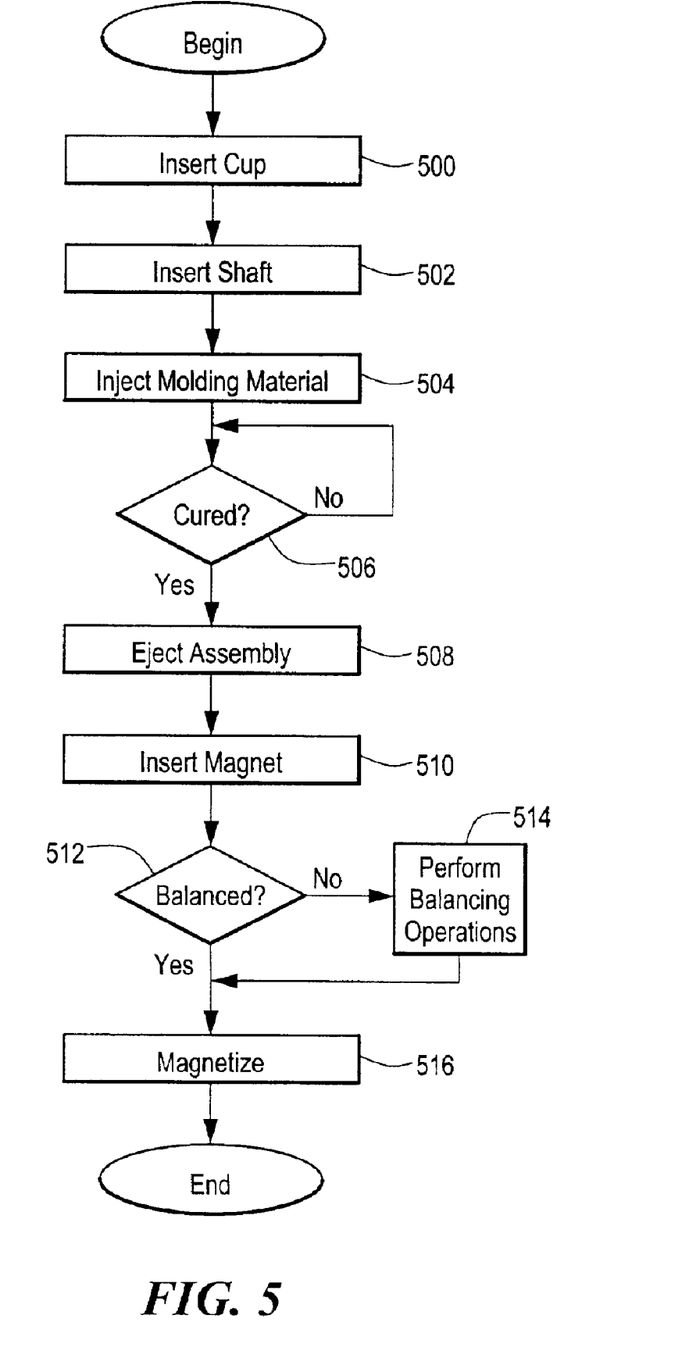
FIG. 5 shows a process of producing a rotor in accordance with illustrative embodiments of the invention.

FIG. 5 shows a process of producing a rotor assembly 34 in accordance with illustrative embodiments of the invention. The process begins at step 500, in which the cup 36 is inserted into and positioned about the noted inner diameter of the central portion 62 of the first mold half 46. The process then continues to step 502, in which the shaft 32 is inserted and positioned within the shaft recess 56 in the central portion 62 of the first mold half 46. Although discussed as being executed in this order, steps 500 and 502 can be executed in any order, or at the same time. In addition, when inserted into the shaft recess 56, the shaft 32 is fixedly positioned so that it passes through the center hole 38 of the cup 36. In particular, the shaft 32 is positioned within the shaft recess 56 so that the securing flange 42 is positioned past the top surface of the cup 36. Moreover, the shaft 32 is positioned so that its outer diameter does not contact the inner diameter of the center hole 38, and so that it is substantially perpendicular to the inner surface of the cup 36. Stated another way (as noted above), shaft 32 is fixedly positioned so that its longitudinal axis is substantially coincident with the center axis of the cup 36. The close tolerances of the first mold half 46 should ensure that this is the case.

The process then continues to step 504, in which the second mold half 48 is brought into coupling contact with the first mold half 46, thus forming the molding chamber 50. Molding material then is injected into the molding chamber 50. To that end, the valve gates 52 are controlled, by conventional processes, to permit a predetermined volume of molding material into the molding chamber 50. The molding material may be any resin or other material that commonly is used in molding processes. The molding material then fills the chamber 50 as desired in the shape of a propeller. To that end, the molding material fills the space between the top portion of the shaft 32 and the inner diameter of the cup center hole 38. This material, as well as other molding material that contacts that side of the shaft 32, further secures the shaft 32 with the cup 36.

It then is determined at step 506 if the molding material has cured. If it has cured, then a solid propeller 12 has been formed and has been fixedly secured to the cup 36 and shaft 32, thus producing the rotor assembly 34. The process then continues to step 508, in which the rotor assembly 34 is ejected from the molding chamber 50. To that end, the second mold half 48 is uncoupled from the first mold half 46, thus exposing the top of the rotor assembly 34. The ejection pins 60 in the first mold half 46 then bear against the interior of the cup 36 and the bottom surface of the shaft 32, thus forcing the finished product from the first mold half 46. The annular permanent magnet then is secured to the inner annular surface of the cup 36 to complete the primary structure of the rotor 20 (step 510). It should be noted that at this point, illustrative embodiments of the magnet are not magnetized.

It then is determined at step 512 if the rotor 20 is balanced. Of course, in illustrative embodiments, the rotor 20 should not be out of balance due to the shaft 32 and cup 36 alignment since such elements were fixedly secured in their perpendicular relationship. For example, the rotor 20 may be out of balance due to the annular permanent magnet placement within the cup 36.

Many motor manufacturers nevertheless are required to perform a quality control function that checks each rotor 20 for proper balance, even if such rotor 20 was produced by a process with a low probability of producing imbalanced rotors 20. If it is balanced, then the process ends. If the rotor 20 is not balanced, then the process continues to step 514 to perform conventional balancing operations. For example, small pieces of material may be connected to the rotor 20 at selected locations to offset a weight disparity at a corresponding part of the rotor 20. In illustrative embodiments, balancing material is injected into the void 68 formed by the molding process. The process then continues to step 516, in which the magnet is magnetized in accordance with conventional processes. The rotor 20 then is ready to be coupled with the stator 18, thus continuing the production of the motor 10.

Accordingly, illustrative embodiments have a high rate of producing a balanced rotor assembly 34 that does not require balancing operations. Since fewer rotors 20 should be out of balance, fewer personnel are required to balance rotors 20 that were produced out of balance. Among other things, this saves both time and the necessity of additional personnel in the manufacturing process, thus saving motor manufacturing costs.

Although various exemplary embodiments of the invention are disclosed below, it should be apparent to those skilled in the art that various changes and modifications can be made that will achieve some of the advantages of the invention without departing from the true scope of the invention.

We claim:

1. A method of producing a rotor, the method comprising:
   positioning a shaft in one of a first mold portion and a second mold portion;
   positioning a cup in one of the first mold portion and the second mold portion, the cup having a cup axis;
   mating the first and second mold portions, the mated first and second mold portions forming a chamber, mating including biasing the shaft to be substantially coaxial to the cup axis; and
   injecting molding material into the chamber to produce a molded part that includes the cup and the shaft, the molded part having a part axis, the part axis being substantially coaxial with the shaft.

2. The method as defined by claim 1 wherein the cup has a cup draft, the cup being positioned in the first mold portion via a cup recess having a recess draft, the cup draft being substantially equal to the recess draft.

3. The method as defined by claim 1 wherein the cup and shaft comprise metal.

4. A method of producing a rotor, the method comprising:
   fixedly positioning a cup in a molding machine, the cup having a cup axis;
   fixedly positioning a shaft in the molding machine, the shaft being coaxial with the cup axis within the molding machine; and
   injecting molding material into the molding machine, the molding material forming a molded part that includes the cup and shaft,
   wherein the cup has a cup draft, the cup being positioned in the molding machine via a cup recess having a recess draft, the cup draft being substantially equal to the recess draft.

5. The method as defined by claim 4 further comprising:
   securing a magnet to the cup.

6. The method as defined by claim 4 wherein the molded part includes a propeller coupled about the cup.

7. The method as defined by claim 4 wherein the molding machine implements insert molding processes.

8. The method as defined by claim 4 wherein the cup is positioned in the molding machine before the shaft is positioned in the molding machine.

9. The method as defined by claim 4 wherein the shaft is positioned in the molding machine before the cup is positioned in the molding machine.

10. The method as defined by claim 4 wherein the cup is metal and the shaft is metal.

11. The method as defined by claim 4 wherein the molded part is substantially balanced.

12. The method as defined by claim 4 further comprising:
    removing the molded part from the molding machine.

13. The method as defined by claim 4 wherein the molding material is a resin.

14. The method as defined by claim 1 further comprising:
    securing a magnet to the cup.

15. The method as defined by claim 1 wherein the molded part includes a propeller about the cup.

16. The method as defined by claim 1 wherein the first and second mold portions are a part of a molding machine that implements insert molding processes.

17. The method as defined by claim 1 wherein the molded part is substantially balanced.

18. The method as defined by claim 1 further comprising:
    removing the molded part from the molding chamber.

19. The method as defined by claim 1 wherein the cup has a top surface that is substantially perpendicular to the shaft when the cup and shaft are within the molding portions.

* * * * *